J. HUTCHINGS.
AMALGAMATOR.
APPLICATION FILED AUG. 22, 1917.
1,276,656.
Patented Aug. 20, 1918.
2 SHEETS—SHEET 1.
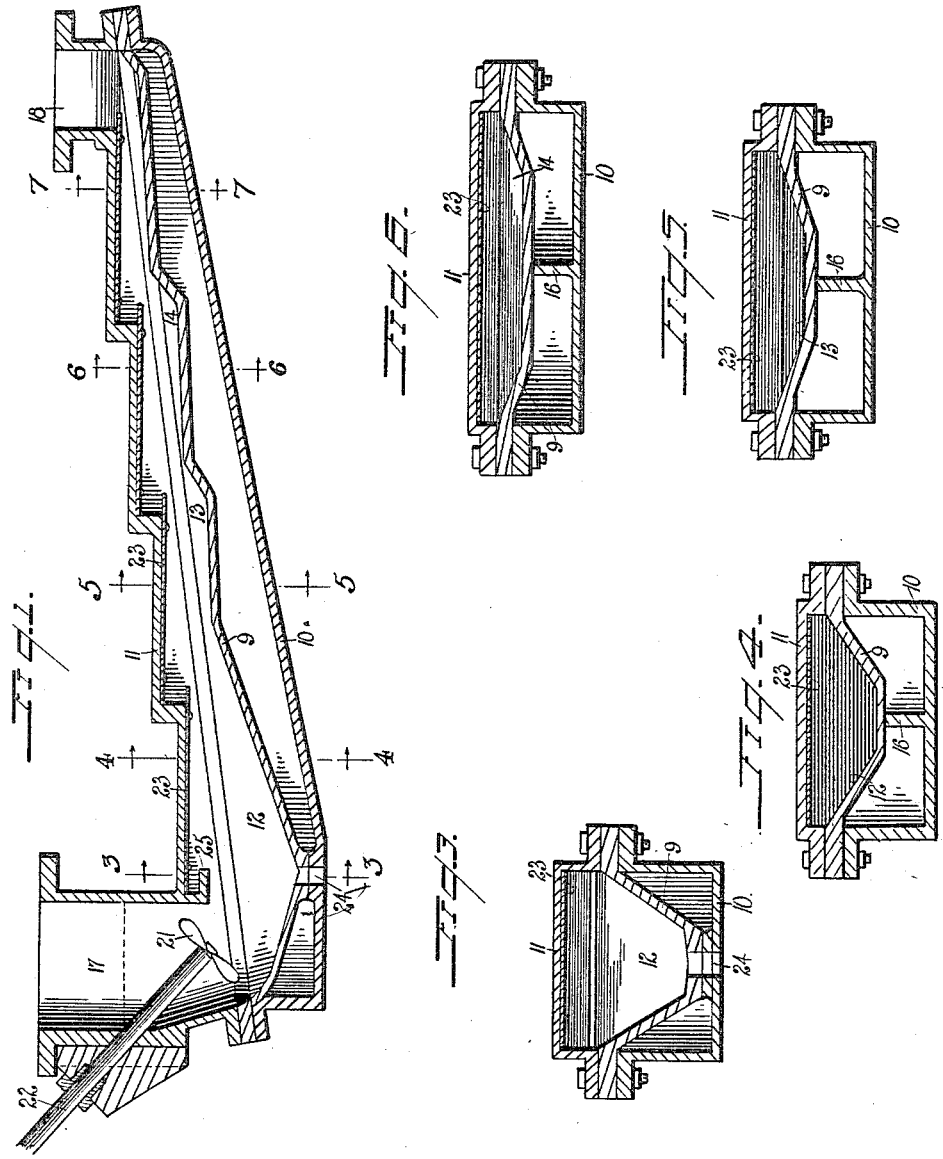
WITNESSES
INVENTOR
James Hutchings
BY
ATTORNEYS.

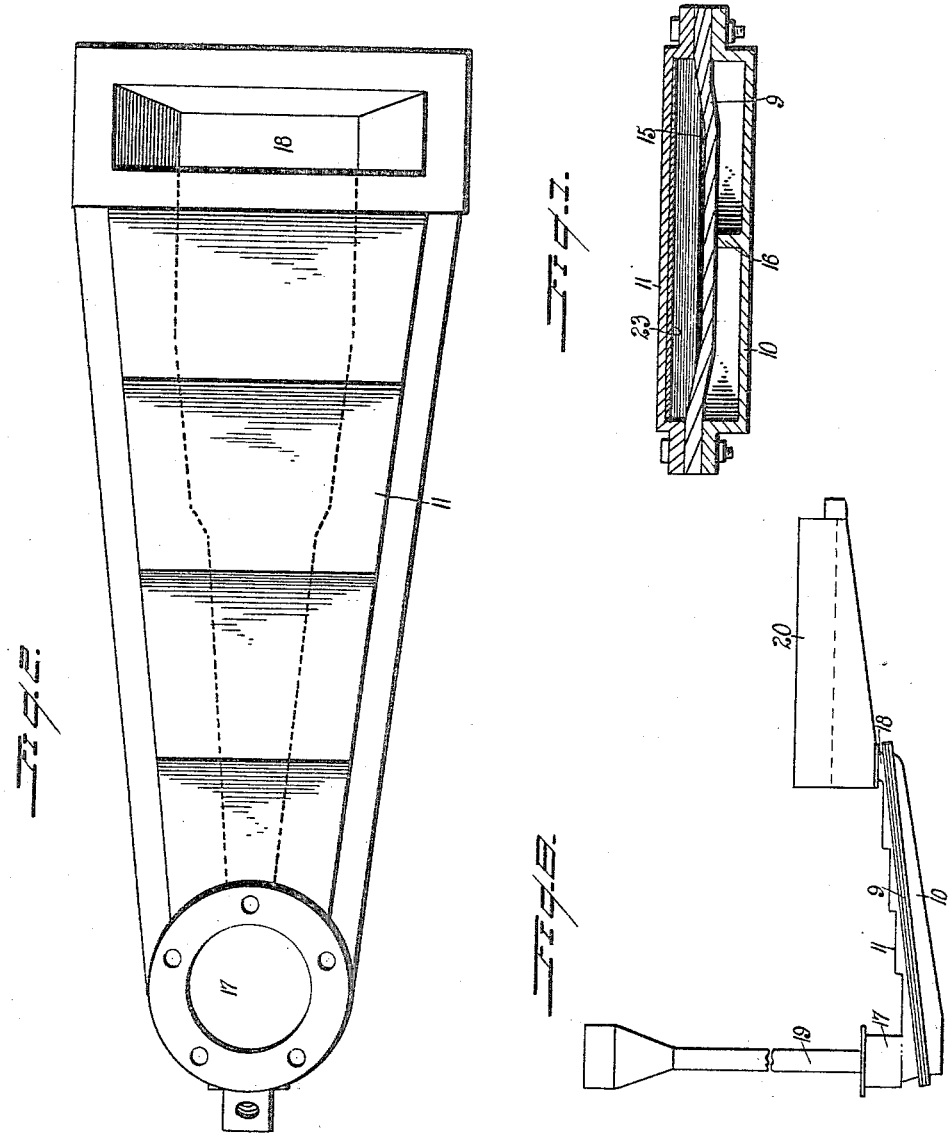

UNITED STATES PATENT OFFICE.

JAMES HUTCHINGS, OF CHICAGO, ILLINOIS.

AMALGAMATOR.

1,276,656.  Specification of Letters Patent.  Patented Aug. 20, 1918.

Application filed August 22, 1917. Serial No. 187,605.

*To all whom it may concern:*

Be it known that I, JAMES HUTCHINGS, a citizen of the United States, and a resident of Chicago, in the county of Cook and State of Illinois, have invented a new and Improved Amalgamator, of which the following is a full, clear, and exact description.

The object of the invention is to provide a simple and efficient amalgamator in which the auriferous bearing material is forced through a layer of mercury with a decreasing speed.

The invention is characterized by a mercury chamber of varying depths and of a cross section increasing toward the outlet, so as to reduce the speed of flow, and means at the chamber's inlet for agitating and propelling the pulp.

The invention is further characterized by a stepped cover for the mercury chamber which carries value recovering plates.

Other characteristics of the invention will more fully appear as the description proceeds.

In the accompanying drawings, forming part of the application, similar characters of reference indicate corresponding parts in all the views.

Figure 1 is a longitudinal section through an amalgamator embodying my invention;

Fig. 2 is a top plan view of the amalgamator;

Figs. 3, 4, 5, 6 and 7 are vertical cross sections through the amalgamator on the lines 3—3, 4—4, 5—5, 6—6, and 7—7 respectively, in Fig. 1; and Fig. 8 is a diagrammatic elevation of the amalgamator connected to the supply column, or stand pipe, and the discharge tank, or hopper.

The amalgamator consists of three sections 9, 10 and 11, which afford convenience in constructing, assembling and inspecting the amalgamator. The inner section 9 is the mercury pan. It forms a series of stepped pan sections 12, 13, 14 and 15. The depths of said pan sections decrease from 12 to 15, but the widths increase as the depths decrease. The increase in width of the chamber is greater than the decrease in depth. In consequence the vertical cross sectional area of the pan sections increases toward the pan section 15. The pan 9 is carried by the section 10 in an oblique position, the slope being from the pan section 15 to the pan section 12, the section 10 serving as a heating jacket for the pan. It has a central rib 16 forming an additional support for the pan and also facilitating a better circulation for the heating medium through the section 10.

The section 11 constitutes the cover for the pan 9. It is stepped to correspond with the pan sections 12 to 15. The cover has at one end a flanged collar 17 forming the inlet to the amalgamator and which leads into the pan section 12. A similar collar 18 is provided at the other end of the cover which forms the outlet of the amalgamator, and it is in communication with the pan section 15.

A stand column 19 is provided on the collar 17. This column is of sufficient height to contain a column of water which balances the depth of mercury, and has a cross-sectional area large enough to freely admit the pulp prepared for treatment and which is fed to the amalgamator. The collar 18 is connected to a discharge tank 20 into which the treated pulp is discharged after it has been forced through the mercury bath in the pan.

To facilitate the movement of the auriferous bearing material through the mercury bath, and also to bring the same into more intimate contact with the particles of mercury of the bath, I provide an agitator 21 in the shape of a propeller entering into the lower part of the collar 17, that is to say, at the entrance into the pan section 12. This propeller is actuated from a shaft 22 projecting out of the cover. This propeller agitates the pulp and mercury, thereby causing an intimate mixture therebetween and, at the same time, forcing that mixture to move toward the collar 18. The mercury bath thins toward the outlet end and it also increases in cross section. In consequence the speed of the flow decreases toward the discharge end. This decrease in speed of the flow permits the reassembling and collection of the mercury and pulp into separate masses before the discharge of the pulp.

To further increase the efficiency of the apparatus, I provide mercury-coated plates 23 which are secured to the inner surface of the cover 11, so that a portion of each plate extends toward the discharge end of the amalgamator, in other words, toward the adjacent pan section. This extension of the mercury-coated plates prevents the formation of eddies and return flow at the corners formed by the steps of the cover, and it gives an additional surface for interaction with the auriferous material flowing through the bath of mercury.

The extension of the plates causes the flow of pulp to pass through a layer of mercury in order to reach the next succeeding plate, thus causing contact of the pulp with the mercury on all sides. In the passage through the sections the difference in specific gravity of the liquids causes the pulp to pass between the plates and a layer of mercury, providing contact above, below, and more or less on the sides; but at the point where the pulp passes from one pan section to another over the extension of the plates 23, the pulp is forced to pass through the mercury between plates 23 and the next succeeding plate. On account of the difference in specific gravity the pulp will pass through this layer of mercury in small globules, thus forming a more intimate contact with the mercury, in consequence of which a larger percentage of values is recovered.

The discharge tank is of comparatively large size, so as to allow the settling of the material entering thereinto from the amalgamator and thereby permit the separation and collection of any mercury which may have passed out of the amalgamator. At the lowermost point of the pan section 12 an aperture 24 is provided whereat a draw-off cock may be secured. To prevent eddy formation near the end of the collar 17 a lateral flange 25 is provided which serves the same purpose as the extension of the plates 23. If desired, side plates may also be provided in the mercury chamber to serve a purpose similar to the plates 23. In lieu of the plates the inside of the top 11 may be coated to serve the same purpose as the plates 23.

I claim:

1. In an amalgamator, a casing having an elongated mercury chamber, said chamber comprising a series of successive pan sections having the bottoms at different levels, the depths of said pan sections decreasing toward the bottom of pans at higher levels but the width of said pan sections increasing toward bottoms of higher level.

2. An amalgamattor comprising a casing having a mercury pan forming a series of pan sections the depths of which decrease toward one end but the widths of which increase toward the same end, and a cover for said pan having an inlet to the pan section of the greatest depth and an outlet from the pan section of the least depth, said cover being stepped to coöperate with the pan sections and to present an increasing cross section of the mercury pan as it approaches the outlet.

3. In an amalgamator, a casing having a mercury chamber provided with an inlet and an outlet, the bottom of the chamber being stepped so as to present a series of pan sections the depths of which decrease toward the outlet but the widths of which pan sections increase toward the outlet, said chamber having a stepped stop coöperating with the stepped bottom, so that the cross-sectional area of the chamber increases toward the outlet to decrease the flow through the chamber toward the outlet, and mercury-coated plates on said stepped top having portions extending toward the outlet of the chamber.

4. In an amalgamator, a casing having an elongated mercury chamber provided with an inlet at one end and an outlet at the other end, said chamber having a cross section increasing toward the outlet and a depth increasing toward the inlet, and mercury-coated plates disposed at the top of said chamber.

5. In an amalgamator, a casing having an elongated mercury chamber provided with an inlet at one end and an outlet at the other end, the depth of said chamber decreasing toward the outlet but the cross section of the chamber increasing toward said outlet, said chamber being adapted to slope toward the deepest part of same, a propeller in proximity to the deepest part of the chamber adapted to facilitate the feeding through the chamber toward the outlet, and mercury-coated plates at the top of the chamber.

6. In an amalgamator, a casing having a mercury chamber provided with an inlet and an outlet, said chamber having a stepped top and a varying depth the maximum of which is in proximity to the inlet, and a varying cross section the maximum of which is in proximity to the outlet, said chamber sloping toward the deepest part of same, and mercury-coated plates secured to the steps of the cover so that a portion of each plate projects beyond the step toward the outlet of the chamber.

7. In an amalgamator, a casing having a mercury chamber provided with an inlet and an outlet, the bottom of the chamber being stepped to present a series of pan sections the depth of which decreases toward the outlet, and the width of which increases toward the outlet, said chamber having a stepped top coöperating with the stepped bottom so that the cross-sectional area of the chamber increases toward the outlet.

8. In an amalgamator, a casing having a mercury chamber provided with an inlet and an outlet, the bottom of the chamber having in cross section the shape of a trapezoid, said chamber having a top coöperating with the bottom and having in cross section the shape of a rectangle, the cross-sectional area formed by the top and bottom of the chamber increasing toward the outlet to decrease the flow through the chamber toward the outlet.

9. An amalgamator comprising a casing having an elongated mercury pan forming a series of inclined pan sections the depths of which decrease toward one end but the widths of which increase toward the same end, and a stepped cover for said pan having an inlet to the pan section of the greatest depth and an outlet from the pan section of the least depth.

JAMES HUTCHINGS.

Copies of this patent may be obtained for five cents each, by addressing the "Commissioner of Patents, Washington, D. C."